US008458725B2

(12) United States Patent
Surlaker et al.

(10) Patent No.: US 8,458,725 B2
(45) Date of Patent: Jun. 4, 2013

(54) COMPUTER IMPLEMENTED METHOD FOR REMOVING AN EVENT REGISTRATION WITHIN AN EVENT NOTIFICATION INFRASTRUCTURE

(75) Inventors: Kapil Surlaker, Mountain View, CA (US); Neerja Bhatt, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1170 days.

(21) Appl. No.: 11/401,560

(22) Filed: Apr. 10, 2006

(65) Prior Publication Data

US 2007/0240169 A1    Oct. 11, 2007

(51) Int. Cl.
*G06F 3/00*  (2006.01)
*G06F 9/44*  (2006.01)
*G06F 9/46*  (2006.01)
*G06F 13/00* (2006.01)

(52) U.S. Cl.
USPC ........................................................ 719/318

(58) Field of Classification Search
USPC ........................................................ 719/318
See application file for complete search history.

(56) References Cited

U.S. PATENT DOCUMENTS

| | | | |
|---|---|---|---|
| 5,471,629 A | | 11/1995 | Risch |
| 5,592,664 A | * | 1/1997 | Starkey .................................. 1/1 |
| 5,666,486 A | | 9/1997 | Alfieri et al. |
| 5,828,882 A | * | 10/1998 | Hinckley ....................... 719/318 |
| 5,881,315 A | | 3/1999 | Cohen |
| 5,999,978 A | | 12/1999 | Angal et al. |
| 6,058,389 A | | 5/2000 | Chandra et al. |
| 6,092,102 A | | 7/2000 | Wagner |
| 6,182,086 B1 | | 1/2001 | Lomet et al. |
| 6,240,453 B1 | | 5/2001 | Chang et al. |
| 6,292,825 B1 | | 9/2001 | Chang et al. |
| 6,427,146 B1 | | 7/2002 | Chu |
| 6,438,705 B1 | | 8/2002 | Chao et al. |
| 6,560,719 B1 | | 5/2003 | Pham et al. |
| 6,757,766 B1 | | 6/2004 | Hutner et al. |
| 6,768,994 B1 | | 7/2004 | Howard |
| 6,782,541 B1 | * | 8/2004 | Cohen et al. ................... 719/318 |
| 6,820,136 B1 | | 11/2004 | Pham et al. |
| 6,826,560 B1 | | 11/2004 | Leymann et al. |

(Continued)

OTHER PUBLICATIONS

Non Final Office Action for U.S. Appl. No. 11/471,167 mailed on Aug. 11, 2009; 7 pages.

(Continued)

*Primary Examiner* — Andy Ho
*Assistant Examiner* — Timothy A Mudrick
(74) *Attorney, Agent, or Firm* — Kilpatrick Townsend & Stockton LLP

(57) ABSTRACT

A computer implemented method and system for automatically removing an event registration within an event notification infrastructure of a database system is disclosed. The method includes removing an event registration from an event queue automatically if a specified active period of time has elapsed. Further, the method includes removing an event registration from an event queue automatically if the event occurred N times where N can be specified at event registration. Also, the method includes removing an event registration from an event queue automatically if either the event occurred N times where N can be specified at event registration or a specified active period of time has elapsed. Moreover, the method includes removing an event registration from an event queue if a client explicitly requests removal of said event registration.

27 Claims, 8 Drawing Sheets

U.S. PATENT DOCUMENTS

| | | | |
|---|---|---|---|
| 6,829,639 B1 | 12/2004 | Lawson et al. | |
| 6,839,748 B1 | 1/2005 | Allavarpu et al. | |
| 6,862,565 B1 | 3/2005 | Elco et al. | |
| 6,889,231 B1 | 5/2005 | Souder et al. | |
| 6,920,468 B1* | 7/2005 | Cousins et al. | 707/203 |
| 6,931,405 B2 | 8/2005 | El-Shimi et al. | |
| 7,039,671 B2 | 5/2006 | Cullen | |
| 7,177,859 B2 | 2/2007 | Pather et al. | |
| 7,185,033 B2 | 2/2007 | Jain et al. | |
| 7,203,706 B2 | 4/2007 | Jain et al. | |
| 7,315,583 B2 | 1/2008 | Kambo et al. | |
| 7,325,019 B2 | 1/2008 | Lam et al. | |
| 7,334,001 B2 | 2/2008 | Eichstaedt et al. | |
| 7,509,415 B2 | 3/2009 | Baekelmans | |
| 7,523,459 B2 | 4/2009 | Russell | |
| 7,584,114 B2 | 9/2009 | Estrada et al. | |
| 7,761,413 B2 | 7/2010 | Surlaker et al. | |
| 7,895,600 B2 | 2/2011 | Surlaker et al. | |
| 2001/0000537 A1 | 4/2001 | Inala et al. | |
| 2002/0095399 A1 | 7/2002 | Devine et al. | |
| 2002/0106070 A1* | 8/2002 | Elsey et al. | 379/218.01 |
| 2002/0116248 A1 | 8/2002 | Amit et al. | |
| 2002/0143819 A1 | 10/2002 | Han et al. | |
| 2002/0165998 A1* | 11/2002 | Hrebejk et al. | 709/318 |
| 2002/0184111 A1 | 12/2002 | Swanson | |
| 2003/0004952 A1 | 1/2003 | Nixon et al. | |
| 2003/0028495 A1 | 2/2003 | Pallante | |
| 2003/0055768 A1 | 3/2003 | Anaya et al. | |
| 2003/0055829 A1 | 3/2003 | Kambo et al. | |
| 2003/0069959 A1 | 4/2003 | Tse | |
| 2003/0208549 A1 | 11/2003 | El-Shimi et al. | |
| 2004/0024794 A1* | 2/2004 | Jain et al. | 707/201 |
| 2004/0034664 A1 | 2/2004 | Jain et al. | |
| 2004/0064430 A1 | 4/2004 | Klein et al. | |
| 2004/0068481 A1 | 4/2004 | Seshadri et al. | |
| 2004/0088401 A1 | 5/2004 | Tripathi et al. | |
| 2004/0123183 A1 | 6/2004 | Tripathi et al. | |
| 2004/0128344 A1* | 7/2004 | Trossen | 709/203 |
| 2004/0249853 A1 | 12/2004 | Cohen et al. | |
| 2004/0254993 A1 | 12/2004 | Mamas | |
| 2005/0003804 A1 | 1/2005 | Huomo et al. | |
| 2005/0021622 A1 | 1/2005 | Cullen | |
| 2005/0021976 A1 | 1/2005 | Trossen | |
| 2005/0027742 A1 | 2/2005 | Eichstaedt et al. | |
| 2005/0038772 A1 | 2/2005 | Colrain et al. | |
| 2005/0038791 A1 | 2/2005 | Ven | |
| 2005/0038801 A1 | 2/2005 | Colrain et al. | |
| 2005/0038831 A1 | 2/2005 | Souder et al. | |
| 2005/0038833 A1 | 2/2005 | Colrain et al. | |
| 2005/0038834 A1 | 2/2005 | Souder et al. | |
| 2005/0080819 A1 | 4/2005 | Rusell | |
| 2005/0198273 A1 | 9/2005 | Childress | |
| 2005/0203908 A1 | 9/2005 | Lam et al. | |
| 2006/0077454 A1 | 4/2006 | Lum et al. | |
| 2006/0200501 A1 | 9/2006 | Holenstein | |
| 2006/0209868 A1 | 9/2006 | Callaghan | |
| 2006/0235831 A1 | 10/2006 | Adinolfi et al. | |
| 2006/0277299 A1 | 12/2006 | Baekelmans et al. | |
| 2007/0112885 A1 | 5/2007 | Farr | |
| 2007/0192386 A1 | 8/2007 | Fries et al. | |
| 2007/0214191 A1 | 9/2007 | Chandrasekaran | |
| 2007/0240170 A1 | 10/2007 | Surlaker et al. | |
| 2007/0250545 A1 | 10/2007 | Surlaker et al. | |
| 2007/0266052 A1 | 11/2007 | Surlaker et al. | |
| 2007/0266393 A1 | 11/2007 | Surlaker et al. | |
| 2007/0276914 A1 | 11/2007 | Surlaker et al. | |
| 2008/0098044 A1 | 4/2008 | Todd | |

OTHER PUBLICATIONS

Final Office Action for U.S. Appl. No. 11/471,167 mailed on Dec. 15, 2009; 13 pages.
Advisory Action for U.S. Appl. No. 11/471,167 mailed on Feb. 25, 2010; 3 pages.
Non Final Office Action for U.S. Appl. No. 11/471,406 mailed on Aug. 18, 2009; 16 pages.
Final Office Action for U.S. Appl. No. 11/471,406 mailed on Feb. 22, 2010; 25 pages.
Non Final Office Action for U.S. Appl. No. 11/401,658 mailed on Jul. 2, 2009; 18 pages.
Final Office Action for U.S. Appl. No. 11/401,658 mailed on Nov. 3, 2009; 22 pages.
Non-Final Office Action for U.S. Appl. No. 11/408,195 mailed on Dec. 17, 2008; 10 pages.
Final Office Action for U.S. Appl. No. 11/408,195 mailed on Jun. 11, 2009; 17 pages.
Advisory Action for U.S. Appl. No. 11/408,195 mailed on Oct. 8, 2009; 3 pages.
Non-Final Office Action for U.S. Appl. No. 11/408,195 mailed on Jan. 20, 2010; 11 pages.
Notice of Allowance for U.S. Appl. No. 11/471,405 mailed on Jan. 26, 2010; 8 pages.
Advisory Action for U.S. Appl. No. 11/471,405 mailed on Apr. 13, 2009; 3 pages.
Final Office Action for U.S. Appl. No. 11/471,405 mailed on Jan. 23, 2009; 15 pages.
Non-Final Office Action for U.S. Appl. No. 11/471,405 mailed on May 14, 2008; 13 pages.
Non-Final Office Action for U.S. Appl. No. 11/471,405 mailed on Jul. 7, 2009; 18 pages.
Hanson et al, "A Flexible and Recoverable Client/server Database Event Notification System," Springer-Verlag, pp. 1998;1-13.
Cyran, "Oracle Database, Concepts, 10g Release 1 (10.1)", Dec. 2003; pp. 1-732.
"Sun One Messaging and Collaboration Event Notification Manual," Sun Microsystems, 2002, pp. 1-16.
Advisory Action for U.S. Appl. No. 11/471,406 mailed on May 5, 2010; 4 pages.
Notice of Allowance for U.S. Appl. No. 11/471,405 mailed on Apr. 20, 2010; 7 pages.
Final Office Action for U.S. Appl. No. 11/408,195 mailed on Jun. 30, 2010; 18 pages.
Non-Final Office Action for U.S. Appl. No. 11/471,167 mailed on Jul. 20, 2010; 11 pages.
Muthulingam et al., "The Do's and Don'ts of Space and Undo Management: Best Practice for Oracle Database 10g," Dec. 2004; pp. 1-34.
U.S. Appl. No. 11/408,195, Advisory Action mailed Sep. 16, 2010, 3 pages.
U.S. Appl. No. 11/471,167, Notice of Allowance mailed Dec. 6, 2010, 7 pages.
U.S. Appl. No. 11/471,406, Non-Final Office Action mailed Nov. 10, 2010, 27 pages.
U.S. Appl. No. 11/471,406, filed Jun. 19, 2006, Office Action mailed Aug. 17, 2012, 87 pages.
Final Office Action for U.S. Appl. No. 11/471,406 mailed on May 24, 2012; 52 pages.
Notice of Abandonment for U.S. Appl. No. 11/401,658 mailed on May 7, 2010; 4 pages.

* cited by examiner

COMPUTER IMPLEMENTED METHOD FOR REMOVING AN EVENT REGISTRATION WITHIN AN EVENT NOTIFICATION INFRASTRUCTURE

FIELD OF THE INVENTION

Embodiments of the present invention generally relate to information management systems and, more particularly, to computer implemented methods and systems for automatically removing an event registration within an event notification infrastructure of a database system.

BACKGROUND OF THE INVENTION

A database system is an organized body of related information. Typically, a database stores a variety of information for an entity. Frequently, a database has different users or clients that access it for different reasons. Some database users, for example, are interested in changes that occur in a database. A change in a database can be significant or minor and may be called an event.

Normally, a database user is not interested in every event that occurs in a database. More likely, a database user is only interested in the occurrence of certain database events. As a consequence of this need, database event notification infrastructures allow database users to set up event registrations in which the client can be electronically notified when certain database events occur without remaining active connections to the database, which would adversely affect the performance of the database. For example, a user can set up an event registration to be notified when a message is being enqueued and the message may indicate that a database change has happened.

Traditionally, once a client registers for event notification of a database event, the event registration remains within the event notification infrastructure until either the client explicitly removes the event registration or there is failure during event notification. However, it maybe inefficient for a database to store a client's event registration in its memory until the client explicitly removes it. This is because clients often leave outdated event registration files in the database which consume computer resources.

For instance, a client might initially register with a database but subsequently forget about the event registration after the event registration loses importance. Also, a database and a client's geographical locations may cause it to be inconvenient or impossible for the client to frequently communicate with the database and remove the event registration explicitly. Moreover, a client may be unmotivated to explicitly remove an event registration from a database because it requires additional time and energy.

Regardless of why a client fails to remove an outdated event registration, the end result remains that outdated event registration files consume a growing amount of memory space and processing power in a database system. For example, every time that an event transpires someone enqueues a message, processing power will be needed to check event registration files to determine whether a client needs to be notified.

On one hand, requiring a client to connect back to the database to remove an event registration adds undesirable overhead. On the other hand, if the client does not connect back to remove event registrations, the client will continue to receive notification that the client is not interested in.

SUMMARY OF THE INVENTION

Accordingly, a computer implemented method and system for automatically removing an event registration within an event notification infrastructure of a database system is disclosed. The method includes removing an event registration from an event queue automatically if a specified active period of time has elapsed. Further, the method includes removing an event registration from an event queue automatically if the event occurred N times where N can be specified at event registration. Also, the method includes removing an event registration from an event queue automatically if either the event occurred N times where N can be specified at event registration or a specified active period of time has elapsed. Moreover, the method may also include removing an event registration from an event queue if a client explicitly requests removal of said event registration.

In one embodiment, the method includes receiving the event registration. Also, the method includes logging the event registration into an event queue of the event notification infrastructure, wherein the event registration specifies an active period during which the event registration is valid. Further, the method includes determining if the active period of time has elapsed. Continuing, the method includes removing the event registration from the event queue automatically if the active period of time has elapsed.

In another embodiment, the method includes receiving the event registration. Also, the method includes logging the event registration into an event queue of the event notification infrastructure, wherein the event registration specifies that the event registration remains valid for N occurrences of an event identified by the event registration. Further, the method includes determining if an Nth occurrence of the event has occurred. Continuing, the method includes removing the event registration from the event queue automatically if the Nth occurrence of the event has occurred.

In yet another embodiment, the method includes receiving a first and a second event registration. Also, the method includes logging the first event registration into an event queue of the event notification infrastructure, wherein the first event registration specifies an active period during which the first event registration is valid. Further, the method includes determining if the active period of time has elapsed. Continuing, the method includes removing the first event registration from the event queue automatically if the active period of time has elapsed. Additionally, the method includes logging the second event registration into an event queue of the event notification infrastructure, wherein the second event registration specifies that the second event registration remains valid only for N occurrences of an event identified by the second event registration. Moreover, the method includes determining if an Nth occurrence of the event has occurred. Furthermore, the method includes removing the second event registration from the event queue automatically if the Nth occurrence of the event has occurred.

In addition, embodiments are also directed to a computer readable media implemented with methods as disclosed above.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
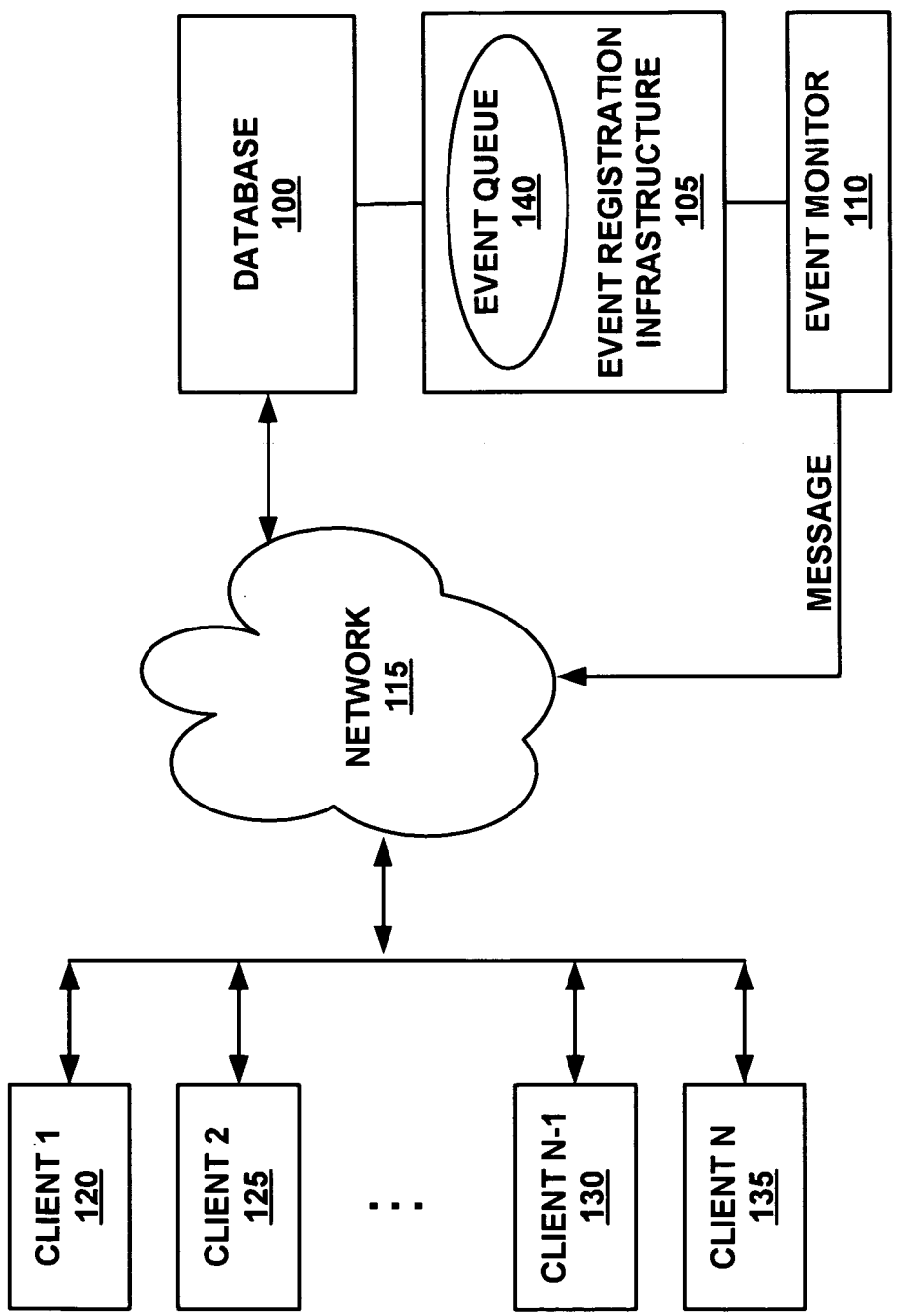
FIG. 1 illustrates a block diagram of a database system having an event notification and registration infrastructures.

FIG. 1 illustrates a block diagram of a computer implemented system including an event notification infrastructure, according to an embodiment of the present invention. Components of the system for an event notification infrastructure include a database system 100, an event notification infrastructure 105, an event monitor 110, a network 115, client1 120, client2 125, clientN−1 130, and clientN 135. The database system 100 is an organized body of related information. The event notification infrastructure 105 is where event registrations are stored. The event monitor 110 monitors the database for pertinent events and also performs the function of notifying relevant clients when certain events occur. In addition, incorporated herein by reference is U.S. Pat. No. 6,910,070 which further describes functions that may be performed by an event monitor 110. Also, it is appreciated that an event can be many things. For example, an event may be a change in a database and can be significant or minor. For example, an event can be a message being published for a subscriber and entered into a queue, an event may be instances or databases going up or down, or a change in database objects, or an explicit post for a certain entity. Events may be a number of well known database functions. The network 115 is a data communications system that interconnects computer systems at various different sites. The network 115 may be composed of any combination of Local Area Networks or Wide Area Networks.

Each of the clients 120, 125, 130, and 135 may be communicating to the database system 100 through the network 115 that may include, for example, the Internet, a leased line and/or some other public, private, or hybrid network. Any of a number of well known communication links may be used. The database system 100 is coupled to the event notification infrastructure 105 and the event monitor 110. Clients 120, 125, 130, and 135 may each send an event registration to the event notification infrastructure 105 through network 115. After the event notification infrastructure 105 receives an event registration, the event registration will be logged into the event queue 140 of the event notification infrastructure. If an event specified in the event registration by a client occurs, the event monitor 110 will send a message through the network 115 to notify the relevant client. Clients that register for an event may be called subscribers for that event.

Figure 2:
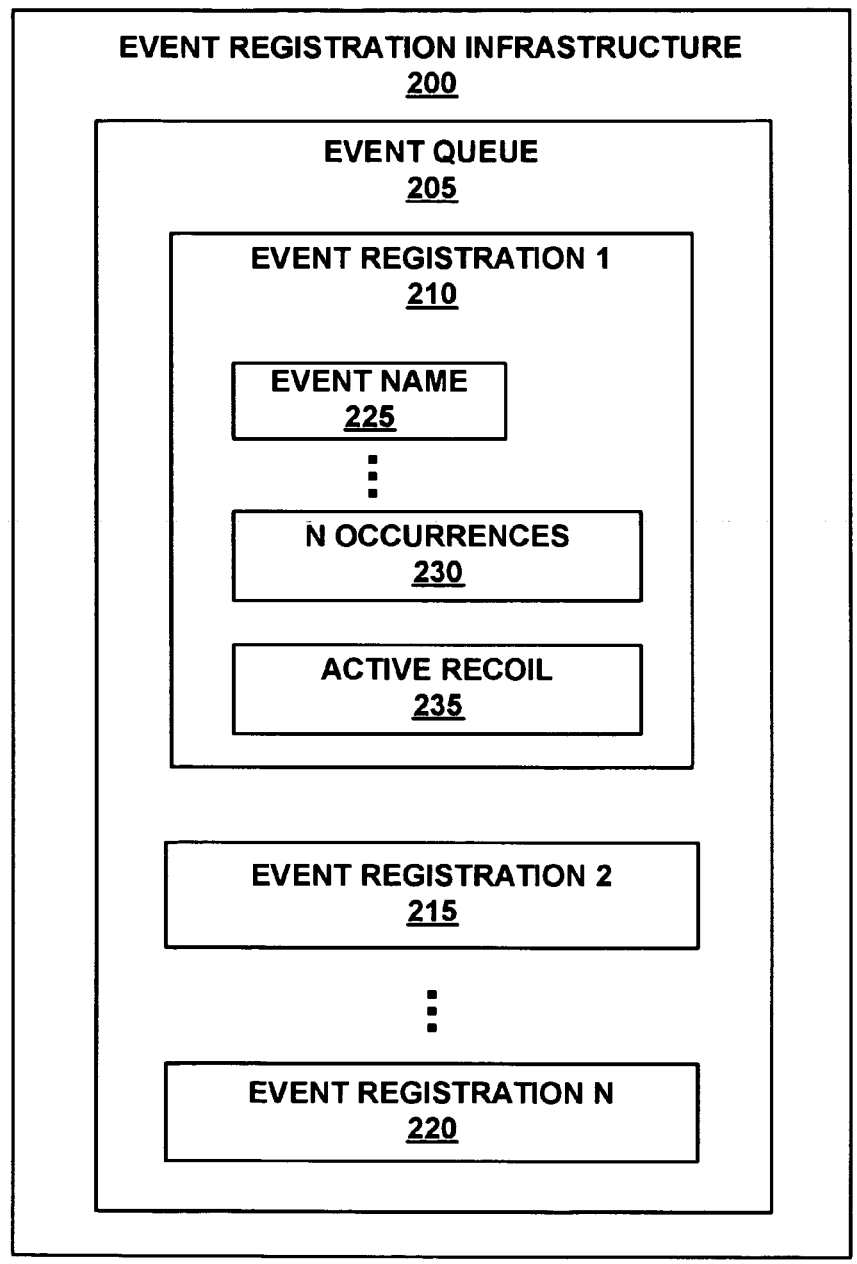
FIG. 2 illustrates a block diagram of an event notification infrastructure in accordance with an embodiment of the present invention.

FIG. 2 illustrates a block diagram of the components of an event notification infrastructure, according to an embodiment of the present invention. The components include the event notification infrastructure 200, the event queue 205, event registration1 210, event registration2 215, event registrationN 220, event name 225, N-occurences 230 and, active period 235. The event queue 205 is located within the event notification infrastructure 200 and maintains a history of event registrations. Each event registration pertains to an event that is being monitored and specifies a number of fields including the pertinent subscriber. Furthermore, the event registration1 210 through event registrationN 220 are stored within the event queue 205. The event registration1 210 through event registrationN 220 may have various parameters stored within the fields. For example, an active period parameter 235 may be specified and stored within event registration1 210 to allow removal of a corresponding event registration from the event queue automatically if the specified active period of time has elapsed. Also, an N-occurrence parameter 230 may be stored within event registration1 210 to allow removal of the associated event registration from the event queue automatically if the event occurred N times where N can be specified at event registration. In addition, an active period parameter 235 and an N-occurrence parameter 230 may both be stored within event registration1 210 to allow removal of event registration1 from the event queue 205 automatically if either the event occurred N times where N can be specified at event registration or the specified active period of time has elapsed.

For purposes of the present invention, the active period parameter 235 can be defined in many ways. For example, an active period parameter 235 may be defined to begin running when the associated event registration1 210 is first logged into the event queue 205. Alternatively, an active period parameter 235 may be defined to begin running from a preset later time. For example, an active period parameter 235 may be set to begin running 1 month from the time an event registration1 210 is logged into the event queue 205. Also, an active period parameter 235 may be defined to begin running when an event, different from the event specified by the event registration, occurs. For example, an active period parameter 235 may be defined to begin running when eventX occurs, where eventX is not the event specified by event registration1 210. Moreover, an active period parameter 235 may be defined to be discontiguous future periods of time that need not be equal in length. For example, an active period parameter 235 may be defined to be 24 hours a day immediately following event registration during the first month, 20 hours a day during the second month, 10 hours a day during the third month, and to terminate after 3 months.

Also, for purposes of the present invention, N can be any natural number. Frequently, N is one. However, N can be any natural number equal to or greater than one.

Traditionally, once a client registers for event notification of a database event, the event registration remains within the database until either the client explicitly removes the event registration or there is failure during event notification. However, it is inefficient for a database to store a client registration in its memory until the client explicitly removes it. This is because clients often leave outdated registration files in the database that consume computer resources. For instance, a client might initially register with a database but subsequently forget about the registration after the registration loses importance. Also, a database and a client's geographical locations may cause it to be inconvenient or impossible for the client to couple with the database and remove the registration explicitly. Moreover, a client may be unmotivated to explicitly remove a registration from a database because it requires additional time and energy. In addition, a client may only be interested in the first N occurrences of an event or only if the event occurs within a specified period of time. For example, a client may be only interested if an event occurs within a certain period immediately following event registration. In another example, a client may be only interested if an event occurs between a certain first future point in time and a certain second future point in time. In still another example, a client may be only interested if an event occurs within a certain period after another event occurs. In yet another example, a client may be only interested if an event occurs within certain disconnected future periods of time that need not be equal in length. Likewise, once an event has occurred N times, a client may no longer be interested in the event.

Figure 3A:
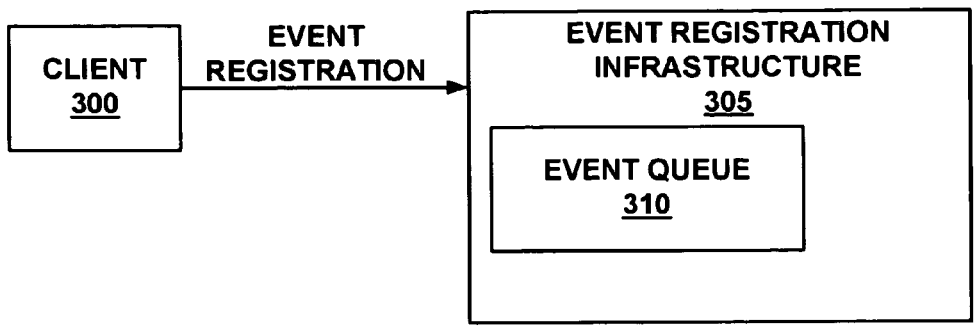
FIGS. 3A, 3B, and 3C illustrate block diagrams of an event registration being automatically removed from an event notification infrastructure in accordance with an embodiment of the present invention.
Figure 3B:
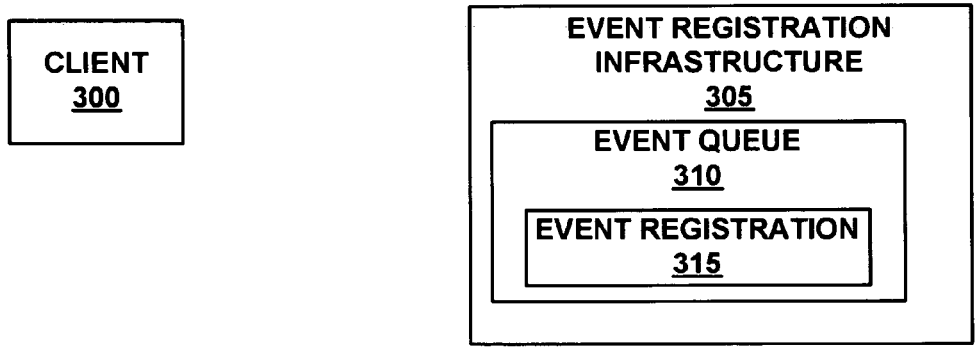
Figure 3C:
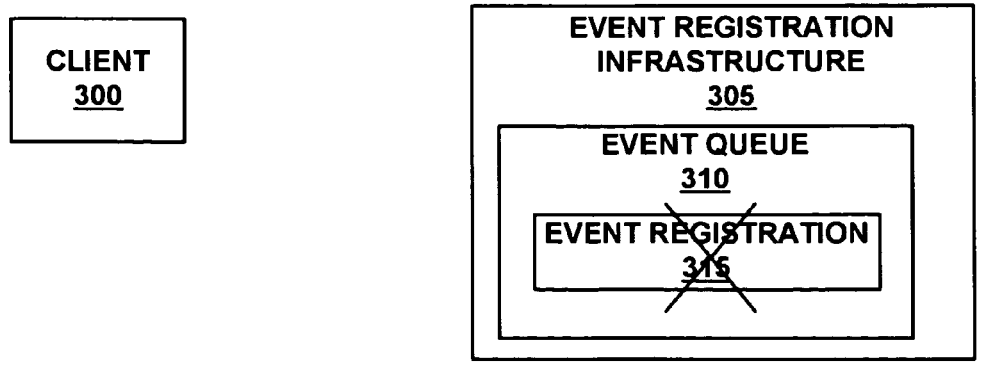

In contrast to conventional approaches, in one embodiment, as shown in FIGS. 3A, 3B, and 3C, a block diagram is shown of a client and an event notification infrastructure that allows a client to specify at the time of event registration: 1) an active period during which the event registration is valid and/or; 2) that an event registration will be automatically removed from an event queue if the event occurred N times where N can be specified at event registration. The components include the client 300, event notification infrastructure 305, and the event queue 310. In FIG. 3A, the event notification infrastructure 310 receives an event registration from the client 300. In FIG. 3B, the event registration 315 is logged into the event queue 310. For purposes of the present invention, logging can be performed in many ways. For example, logging may mean that the event registration 315 is saved onto one or more memory spaces accessible to the event notification infrastructure 310. Also, logging may mean that an event registration 315 will be stored in a memory space accessible to the event notification infrastructure 310 for only a limited amount of time. Moreover, logging may mean that an event registration 315 will be stored in a memory space accessible to the event notification infrastructure 310 until the memory space is reassigned to receive a newer event registration having a higher priority. Also, logging of an event registration 315 can be simultaneous or delayed with respect to the time a client 300 sends in the client 300's event registration 315. For example, logging may occur slightly later than the time when a client 300 sends in an event registration 315.

In FIG. 3C, the event registration 315 is automatically removed from the event queue 310 because of either a specified active period of time has elapsed or an event occurred N times where N can be specified at event registration. For purposes of the present invention, removal can be performed in many ways. For example, removal may mean that the event registration 315 is flagged or marked as invalid but not immediately deleted from a memory space accessible to the event notification infrastructure 310. In another example, removal may mean that the event registration 315 is deleted from a memory space accessible to the event notification infrastructure 310. Also, removal of an event registration 315 can be simultaneous or delayed with respect to either the passage of a specified active period of time or the Nth occurrence of an event where N can be specified at event registration. For instance, if an event registration 315 has a specified active period of 1 hour, then the automatic removal of the event registration 315 may occur exactly after 1 hour has elapsed or sometime after 1 hour has elapsed.

Consequently, the event notification infrastructure 310 will be able to remove certain event registrations 315 automatically. Hence, the present invention allows a database to function more efficiently. In addition, the present invention helps to prevent a client from receiving out-dated event notifications. Also, one of the platforms that the present invention can be operated on is the general purpose computer.

Furthermore, in the case where a client is coupled to an event notification infrastructure, the client may desire to explicitly request removal of the event registration. For example, even if a client specified at the time of event registration an active period during which the event registration is valid, the client may later realize the active period is too long.

Figure 4A:
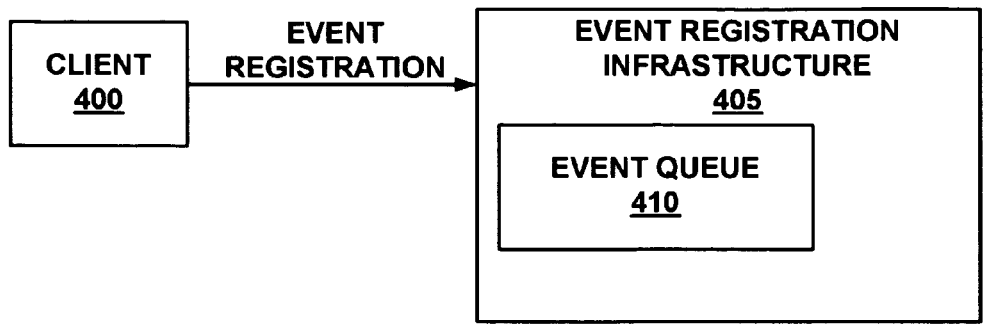
FIGS. 4A, 4B, and 4C illustrate block diagrams of an event registration being removed when a client explicitly requests removal of the event registration from an event notification infrastructure in accordance with an embodiment of the present invention.
Figure 4B:
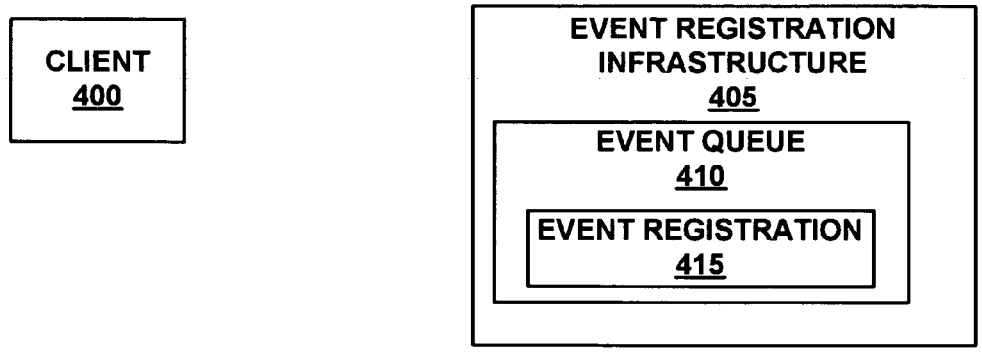
Figure 4C:
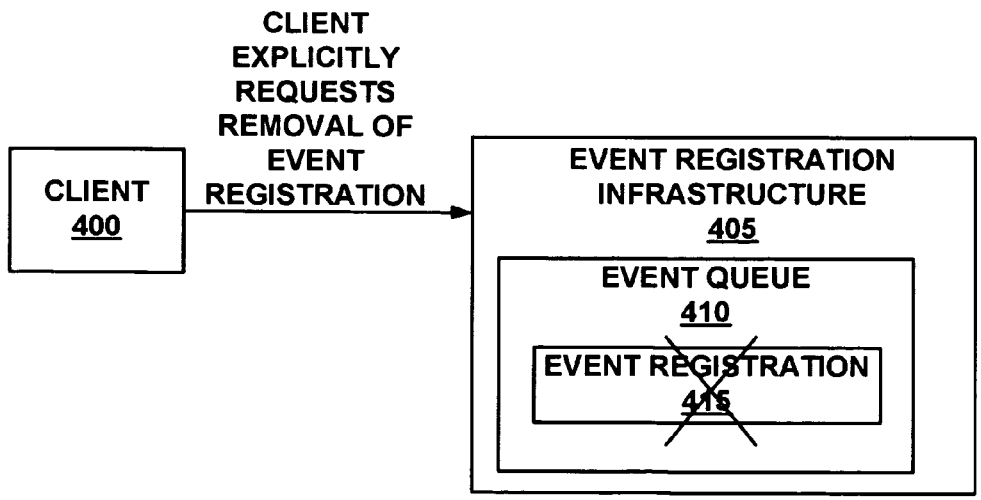

Thus, in one embodiment, as shown in FIGS. 4A, 4B, and 4C block diagrams of a client and an event notification infrastructure are illustrated where a client can explicitly remove an event registration in addition to the automatic event removal parameters discussed above. The components include the client 400, event notification infrastructure 405, and the event queue 410. In FIG. 4A, the event notification infrastructure 410 receives an event registration from the client 400. In FIG. 4B, the event registration 415 is logged into the event queue 410. In FIG. 4C, the event registration 415 is automatically removed from the event queue 410 because the client 400 has explicitly requested removal of the event registration 415. Consequently, if a client 400 is coupled to the event notification infrastructure 410 the client 400 can remove an event registration 415 without waiting for an automatic removal. Hence, the present invention allows greater flexibility for the client 400.

Figure 5:
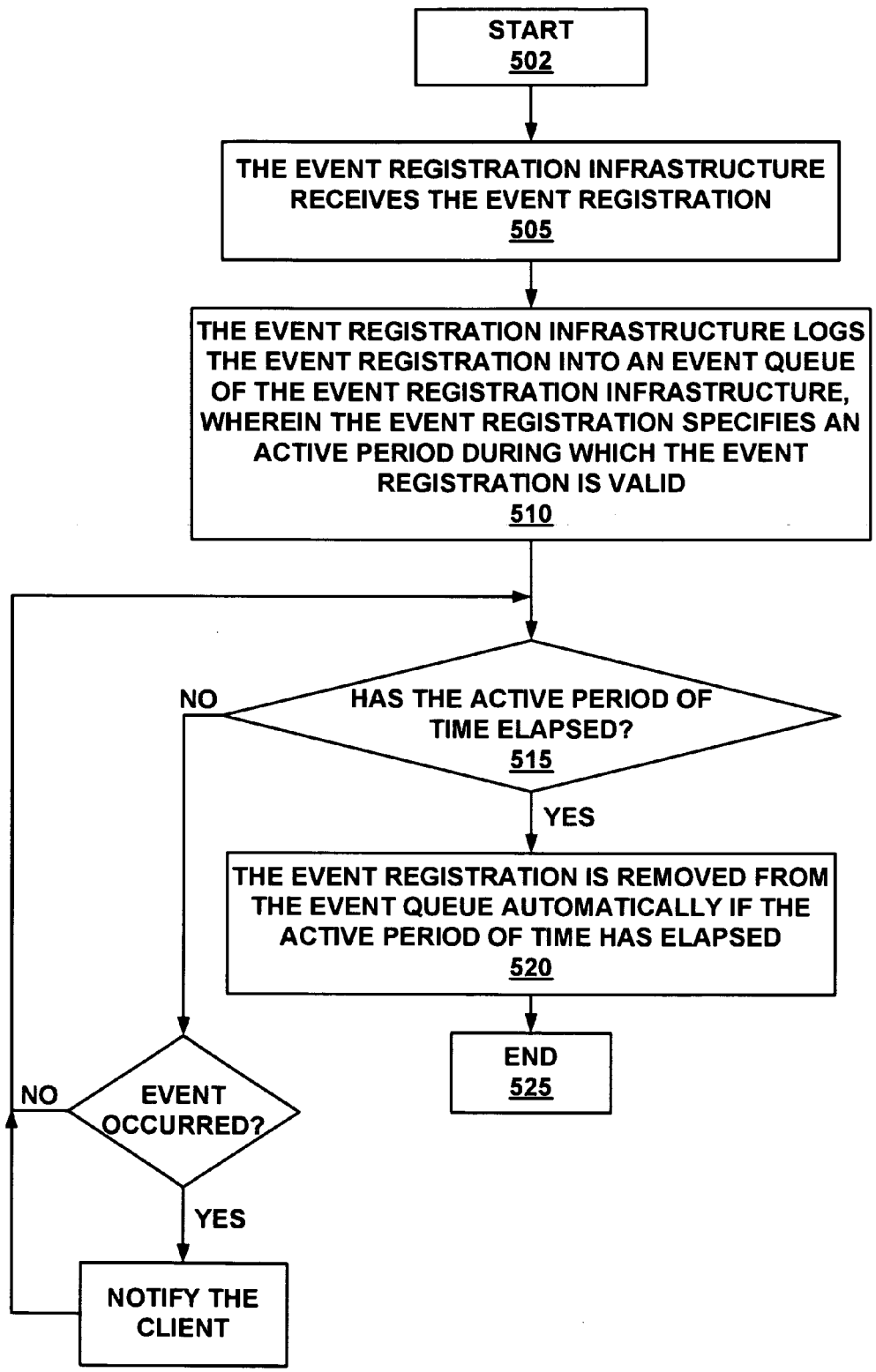
FIG. 5 illustrates a flowchart of a computer implemented method for automatically removing an event registration within an event notification infrastructure by specifying an active period in accordance with an embodiment of the present invention.

FIG. 5 illustrates a flowchart showing a computer implemented method 500 for automatically removing an event registration within an event notification infrastructure based on a specified time period. At block 502, the process starts. At block 505, the event notification infrastructure receives the event registration from a database client. At block 510, the event registration is logged into an event queue of the event notification infrastructure, wherein the event registration specifies an event to be monitored, a subscriber, and an active period during which the event registration is valid. At block 515, a determination is made as to whether the active period of time has elapsed. The event monitor may perform this function. At block 520, the event notification infrastructure removes the event registration from the event queue automatically if the active period of time has elapsed. Again, the event monitor may perform this function. At block 525, the process ends.

Figure 6:
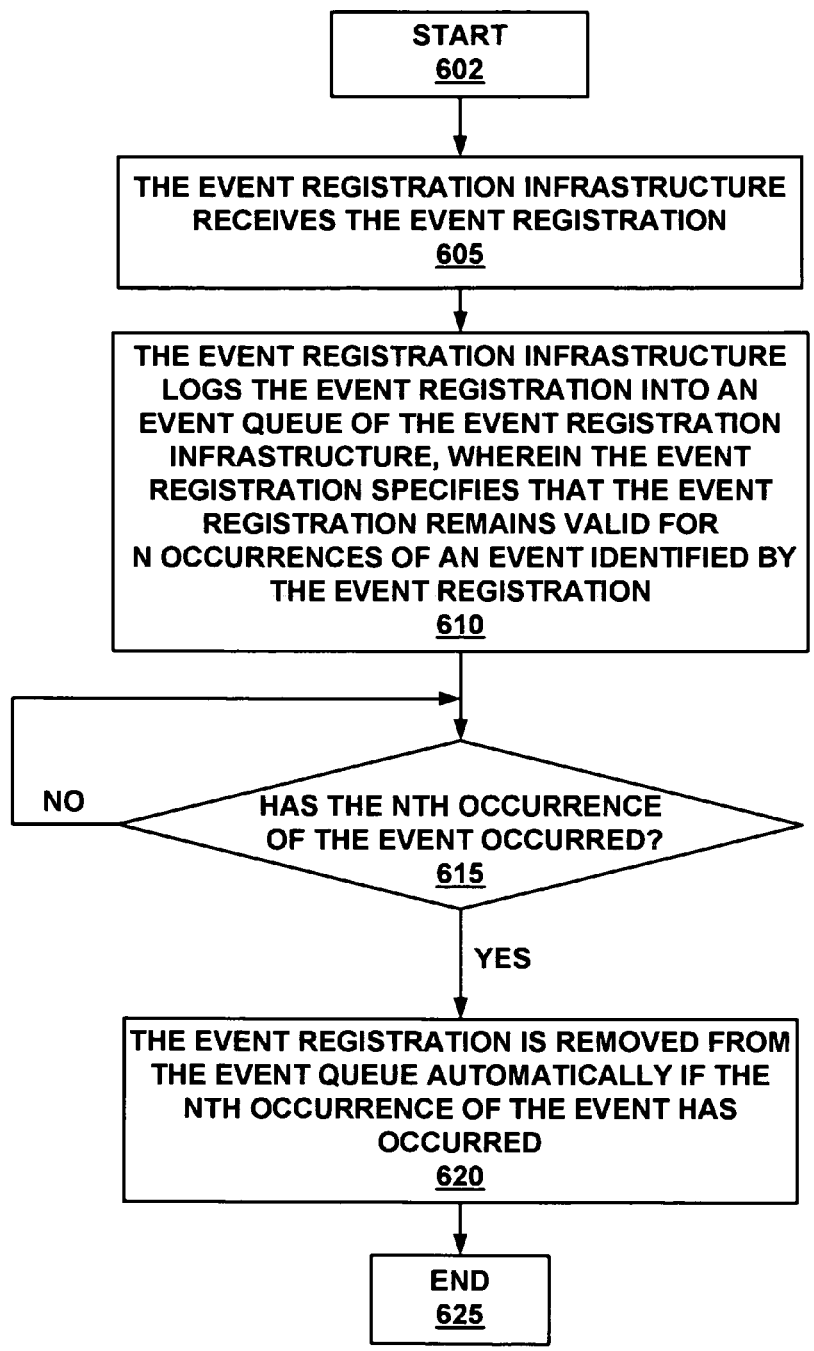
FIG. 6 illustrates a flowchart of a computer implemented method for automatically removing an event registration within an event notification infrastructure by specifying an Nth occurrence in accordance with an embodiment of the present invention.

FIG. 6 illustrates a flowchart showing a computer implemented method 600 for automatically removing an event registration within an event notification infrastructure based on a number of occurrences of the event. At block 602 the process starts. At block, 605, the event notification infrastructure receives the event registration from a client. At block 610, the event registration includes the event to be monitored, an identification of the subscribers, and a specification of a number, N, of occurrences of the event registration is logged into an event queue of the event notification infrastructure, wherein the event registration specifies that the event registration remains valid for N occurrences of an event identified by the event registration. At block 615, a determination is made as to whether an Nth occurrence of the event has occurred. At block 620, the event notification infrastructure removes the event registration from the event queue automatically if the Nth occurrence of the event has occurred. The event monitor may perform these functions. At block 625, the process ends.

Figure 7:
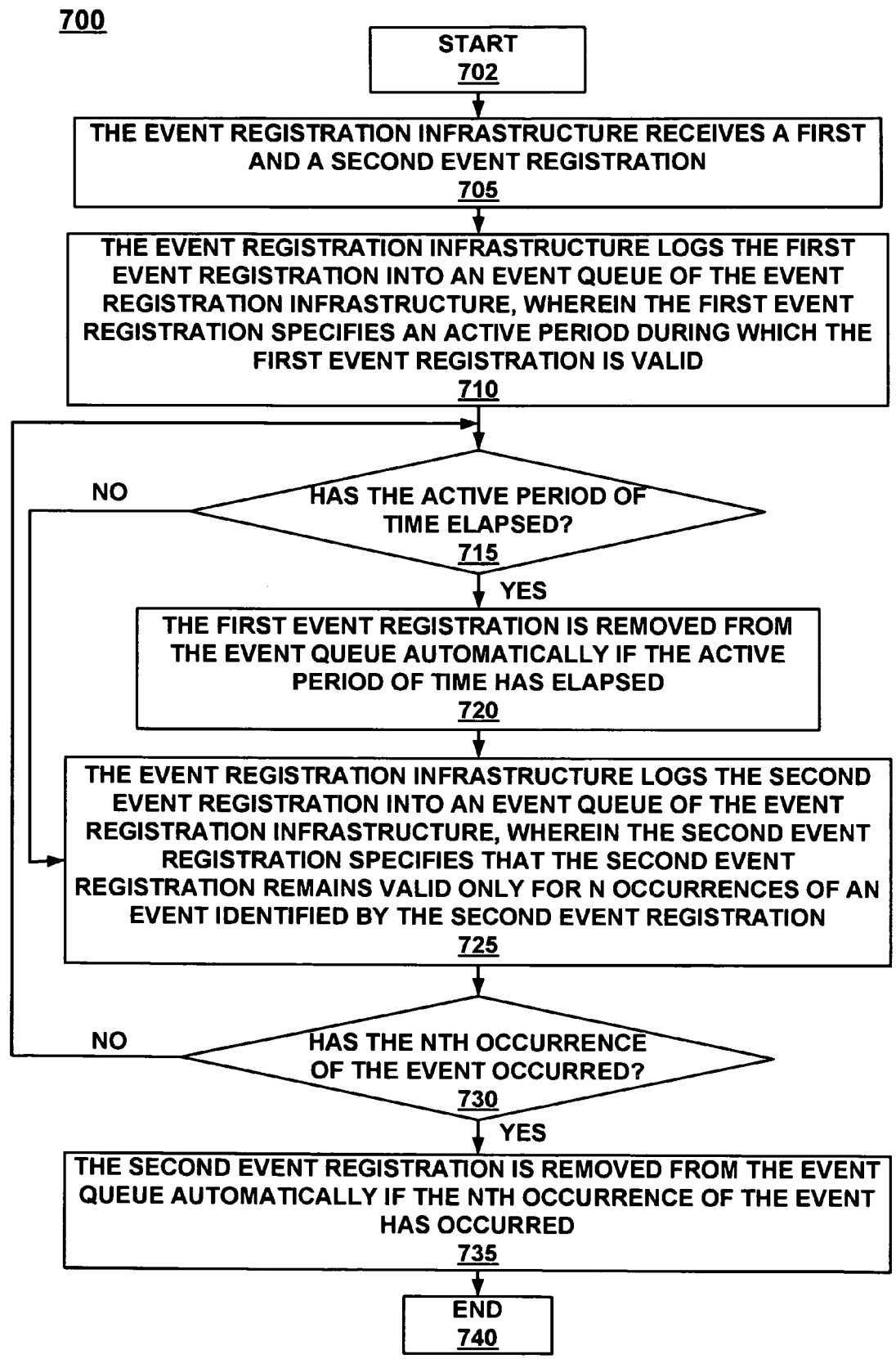
FIG. 7 illustrates a flowchart of a computer implemented method for automatically removing an event registration within an event notification infrastructure by specifying an active period and an Nth occurrence in accordance with an embodiment of the present invention.

FIG. 7 illustrates a flowchart showing a computer implemented method 700 for automatically removing an event registration within an event notification infrastructure based on a combination of parameters. At block 702, the process starts. At block 705, the event notification infrastructure receives a first and a second event registration. At block 710, the first event registration is logged into an event queue of the event notification infrastructure, wherein the first event registration specifies an active period during which the first event registration is valid. At block 715, a determination is made as to whether the active period of time has elapsed. At block 720, the event notification infrastructure removes the first event registration from the event queue automatically if the active period of time has elapsed. At block 725, the second event registration is logged into an event queue of the event notification infrastructure, wherein the second event registration specifies that the second event registration remains valid only for N occurrences of an event identified by the second event registration. At block 730, a determination is made as to whether an Nth occurrence of the event has occurred. At block 735, the event notification infrastructure removes the second event registration from the event queue automatically if the Nth occurrence of the event has occurred. At block 740, the process ends.

Figure 8:
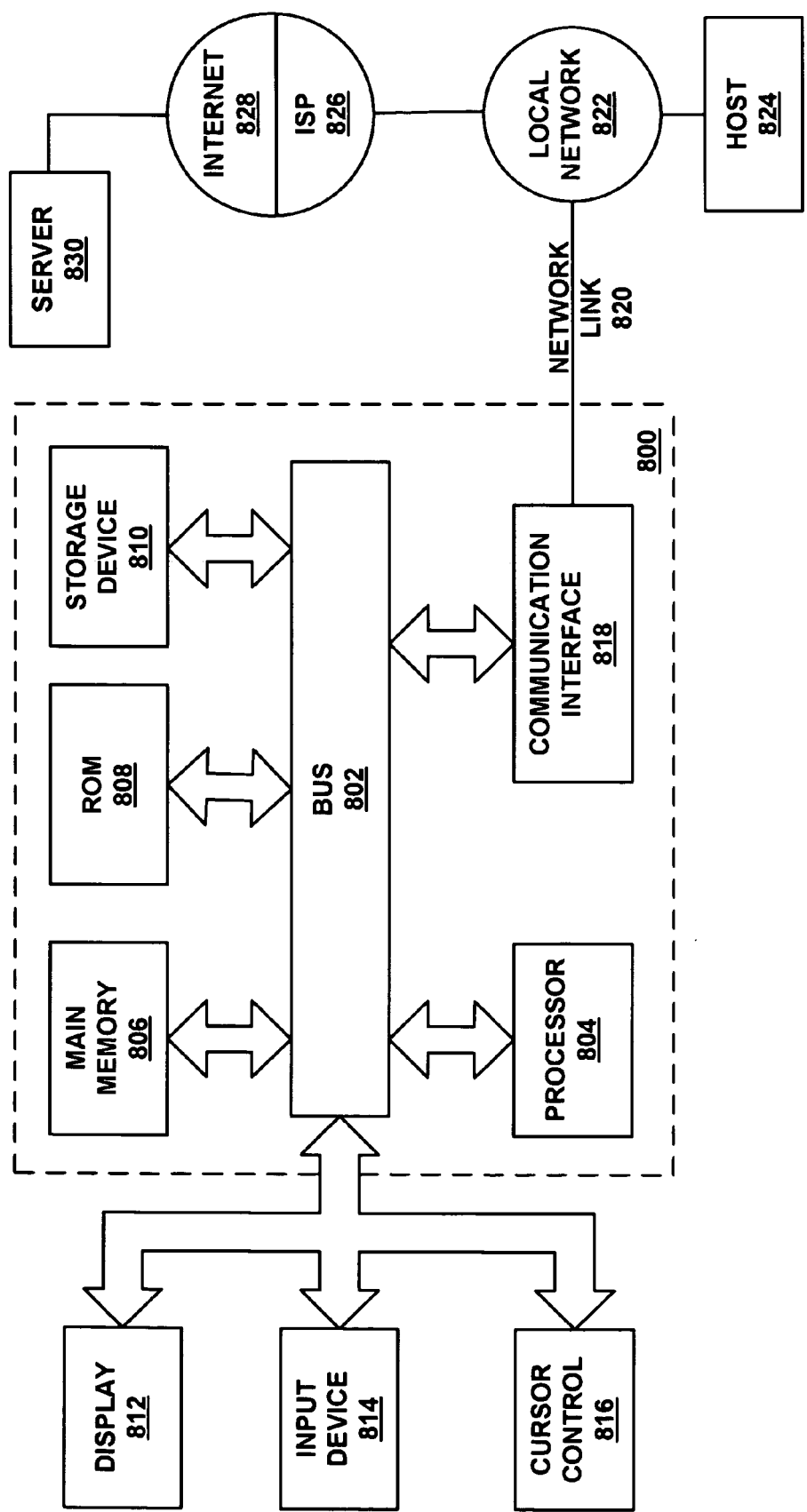
FIG. 8 is a block diagram that illustrates a computer system upon which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing event registrations in a database system. According to one embodiment of the invention, the management of event registrations in a database system is provided by computer system 800 in response to processor 804 executing one or more sequences of one or more instructions contained in main memory 806. Such instructions may be read into main memory 806 from another computer readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send event registrations and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for removing an event registration within an event notification infrastructure of a database system, said method comprising:
   receiving a first event registration at the event notification infrastructure of the database system from a client of the database system, the first event registration comprising a plurality of parameters, the plurality of parameters include at least one parameter from the client defining a database event to be monitored by the event notification infrastructure of the database system and at least two parameters from the client defining an active period for the first event registration, the at least two parameters defining the active period including at least one parameter specifying an active period of time during which said first event registration is valid and at the end of which said first event registration automatically expires and at least one parameter defining a beginning time for the active period;
   logging said event registration into an event queue of said event notification infrastructure of the database system, wherein the event queue comprises a plurality of event registration records, wherein each event registration record comprises a plurality of fields, wherein the plurality of fields comprises a field identifying a subscriber, a field identifying a name of the event registration, a field identifying a beginning time for the event registration, and at least one field identifying an active period for the event registration, and wherein logging said first event registration into the event queue comprises creating and storing a record of the plurality of records based on the parameters of the first event registration;
   determining with the event notification infrastructure of the database system if said active period of time for the first event registration has elapsed; and
   removing said first event registration from said event queue automatically with the event notification infrastructure of the database system if said active period of time has elapsed.

2. The method as recited in claim 1 further comprising:
   receiving a second event registration at the event notification infrastructure of the database system;
   logging said second event registration into said event queue of said event notification infrastructure of the database system, wherein said second event registration includes a parameter defining an active period for the second event registration, wherein the active period for the second event registration specifies that said second event registration remains valid for N occurrences of said event identified by said second event registration;
   determining with the event notification infrastructure of the database system if an Nth occurrence of said event has occurred; and
   removing said second event registration from said event queue automatically with the event notification infrastructure of the database system if said Nth occurrence of said event has occurred.

3. The method of claim 2, further comprising:
   receiving a third event registration at the event notification infrastructure of the database system;
   logging said third event registration into said event queue of said event notification infrastructure of the database system, wherein said third event registration includes a parameter defining an active period for the third event registration, wherein the active period for the third event registration specifies that said third event registration remains valid for an active period of time or N occurrences of said event identified by said third event registration;
   determining with the event notification infrastructure of the database system if the active period of time has elapsed or an Nth occurrence of said event has occurred; and
   removing said third event registration from said event queue automatically with the event notification infrastructure of the database system if the active period of time has elapsed or said Nth occurrence of said event has occurred.

4. The method as recited in claim 1 further comprising:
   notifying the client with the event notification infrastructure of the database system when the event identified by said first event registration occurred during said active period.

5. The method as recited in claim 4 further comprising:
   removing said first event registration from said event queue with the event notification infrastructure of the database system in response to a failure during said event notification.

6. The method as recited in claim 1, wherein said determining is performed by an event monitor of the database system.

7. The method as recited in claim 1 further comprising:
   removing said event registration from said event queue with the event notification infrastructure of the database system if a client explicitly requests removal of said event registration.

8. The method as recited in claim 1, wherein said event registration identifies an event and wherein said event is a message being enqueued.

9. The method of claim 1, further comprising:
receiving a second event registration at the event notification infrastructure of the database system;
logging said second event registration into said event queue of said event notification infrastructure of the database system, wherein said second event registration includes a parameter defining an active period for the second event registration, wherein the active period for the second event registration specifies that said second event registration remains valid for an active period of time or N occurrences of said event identified by said second event registration;
determining with the event notification infrastructure of the database system if the active period of time has elapsed or an Nth occurrence of said event has occurred; and
removing said second event registration from said event queue automatically with the event notification infrastructure of the database system if the active period of time has elapsed or said Nth occurrence of said event has occurred.

10. A system comprising:
a processor; and
a memory coupled with and readable by the processor and storing a set of instructions which, when executed by the processor, cause the processor to remove event an registration within an event registration infrastructure if a database system by:
receiving a first event registration at the event notification infrastructure of the database system from a client of the database system, the first event registration comprising a plurality of parameters, the plurality of parameters include at least one parameter from the client defining a database event to be monitored by the event notification infrastructure of the database system and at least two parameters from the client defining an active period for the first event registration, the at least two parameters defining the active period including at least one parameter specifying an active period of time during which said first event registration is valid and at the end of which said first event registration automatically expires and at least one parameter defining a beginning time for the active period;
logging said event registration into an event queue of said event notification infrastructure of the database system, wherein the event queue comprises a plurality of event registration records, wherein each event registration record comprises a plurality of fields, wherein the plurality of fields comprises a field identifying a subscriber, a field identifying a name of the event registration, a field identifying a beginning time for the event registration, and at least one field identifying an active period for the event registration, and wherein logging said first event registration into the event queue comprises creating and storing a record of the plurality of records based on the parameters of the first event registration;
determining with the event notification infrastructure of the database system if said active period of time for the first event registration has elapsed; and
removing said first event registration from said event queue automatically with the event notification infrastructure of the database system if said active period of time has elapsed.

11. The system as recited in claim 10 further comprising:
receiving a second event registration at the event notification infrastructure of the database system;
logging said second event registration into said event queue of said event notification infrastructure of the database system, wherein said second event registration includes a parameter defining an active period for the second event registration, wherein the active period for the second event registration specifies that said second event registration remains valid for N occurrences of said event identified by said second event registration;
determining with the event notification infrastructure of the database system if an Nth occurrence of said event has occurred; and
removing said second event registration from said event queue automatically with the event notification infrastructure of the database system if said Nth occurrence of said event has occurred.

12. The system of claim 11, further comprising:
receiving a third event registration at the event notification infrastructure of the database system;
logging said third event registration into said event queue of said event notification infrastructure of the database system, wherein said third event registration includes a parameter defining an active period for the third event registration, wherein the active period for the third event registration specifies that said third event registration remains valid for an active period of time or N occurrences of said event identified by said third event registration;
determining with the event notification infrastructure of the database system if the active period of time has elapsed or an Nth occurrence of said event has occurred; and
removing said third event registration from said event queue automatically with the event notification infrastructure of the database system if the active period of time has elapsed or said Nth occurrence of said event has occurred.

13. The system as recited in claim 10 further comprising:
notifying the client with the event notification infrastructure of the database system when the event identified by said first event registration occurred during said active period.

14. The system as recited in claim 13 further comprising:
removing said first event registration from said event queue with the event notification infrastructure of the database system in response to a failure during said event notification.

15. The system as recited in claim 10, wherein said determining is performed by an event monitor of the database system.

16. The system as recited in claim 10 further comprising:
removing said event registration from said event queue with the event notification infrastructure of the database system if a client explicitly requests removal of said event registration.

17. The system as recited in claim 10, wherein said event registration identifies an event and wherein said event is a message being enqueued.

18. The system of claim 10, further comprising:
receiving a second event registration at the event notification infrastructure of the database system;
logging said second event registration into said event queue of said event notification infrastructure of the database system, wherein said second event registration includes a parameter defining an active period for the second event registration, wherein the active period for the second event registration specifies that said second event registration remains valid for an active period of time or N occurrences of said event identified by said second event registration;

determining with the event notification infrastructure of the database system if the active period of time has elapsed or an Nth occurrence of said event has occurred; and removing said second event registration from said event queue automatically with the event notification infrastructure of the database system if the active period of time has elapsed or said Nth occurrence of said event has occurred.

19. A computer-readable memory storing a set of instructions which, when executed by a processor, cause the processor to remove event an registration within an event registration infrastructure if a database system by:

receiving a first event registration at the event notification infrastructure of the database system from a client of the database system, the first event registration comprising a plurality of parameters, the plurality of parameters include at least one parameter from the client defining a database event to be monitored by the event notification infrastructure of the database system and at least two parameters from the client defining an active period for the first event registration, the at least two parameters defining the active period including at least one parameter specifying an active period of time during which said first event registration is valid and at the end of which said first event registration automatically expires and at least one parameter defining a beginning time for the active period;

logging said event registration into an event queue of said event notification infrastructure of the database system, wherein the event queue comprises a plurality of event registration records, wherein each event registration record comprises a plurality of fields, wherein the plurality of fields comprises a field identifying a subscriber, a field identifying a name of the event registration, a field identifying a beginning time for the event registration, and at least one field identifying an active period for the event registration, and wherein logging said first event registration into the event queue comprises creating and storing a record of the plurality of records based on the parameters of the first event registration;

determining with the event notification infrastructure of the database system if said active period of time for the first event registration has elapsed; and removing said first event registration from said event queue automatically with the event notification infrastructure of the database system if said active period of time has elapsed.

20. The computer-readable memory as recited in claim 19 further comprising:

receiving a second event registration at the event notification infrastructure of the database system;

logging said second event registration into said event queue of said event notification infrastructure of the database system, wherein said second event registration includes a parameter defining an active period for the second event registration, wherein the active period for the second event registration specifies that said second event registration remains valid for N occurrences of said event identified by said second event registration;

determining with the event notification infrastructure of the database system if an Nth occurrence of said event has occurred; and removing said second event registration from said event queue automatically with the event notification infrastructure of the database system if said Nth occurrence of said event has occurred.

21. The computer-readable memory of claim 20, further comprising:

receiving a third event registration at the event notification infrastructure of the database system;

logging said third event registration into said event queue of said event notification infrastructure of the database system, wherein said third event registration includes a parameter defining an active period for the third event registration, wherein the active period for the third event registration specifies that said third event registration remains valid for an active period of time or N occurrences of said event identified by said third event registration;

determining with the event notification infrastructure of the database system if the active period of time has elapsed or an Nth occurrence of said event has occurred; and removing said third event registration from said event queue automatically with the event notification infrastructure of the database system if the active period of time has elapsed or said Nth occurrence of said event has occurred.

22. The computer-readable memory as recited in claim 19 further comprising:

notifying the client with the event notification infrastructure of the database system when the event identified by said first event registration occurred during said active period.

23. The computer-readable memory as recited in claim 22 further comprising:

removing said first event registration from said event queue with the event notification infrastructure of the database system in response to a failure during said event notification.

24. The computer-readable memory as recited in claim 19, wherein said determining is performed by an event monitor of the database system.

25. The computer-readable memory as recited in claim 19 further comprising:

removing said event registration from said event queue with the event notification infrastructure of the database system if a client explicitly requests removal of said event registration.

26. The computer-readable memory as recited in claim 19, wherein said event registration identifies an event and wherein said event is a message being enqueued.

27. The computer-readable memory of claim 19, further comprising:

receiving a second event registration at the event notification infrastructure of the database system;

logging said second event registration into said event queue of said event notification infrastructure of the database system, wherein said second event registration includes a parameter defining an active period for the second event registration, wherein the active period for the second event registration specifies that said second event registration remains valid for an active period of time or N occurrences of said event identified by said second event registration;

determining with the event notification infrastructure of the database system if the active period of time has elapsed or an Nth occurrence of said event has occurred; and removing said second event registration from said event queue automatically with the event notification infrastructure of the database system if the active period of time has elapsed or said Nth occurrence of said event has occurred.

* * * * *

UNITED STATES PATENT AND TRADEMARK OFFICE
CERTIFICATE OF CORRECTION

PATENT NO. : 8,458,725 B2
APPLICATION NO. : 11/401560
DATED : June 4, 2013
INVENTOR(S) : Surlaker et al.

It is certified that error appears in the above-identified patent and that said Letters Patent is hereby corrected as shown below:

In the Specification

In column 4, line 24, delete "N-occurences" and insert -- N-occurrences --, therefor.

Signed and Sealed this
First Day of October, 2013

Teresa Stanek Rea
*Deputy Director of the United States Patent and Trademark Office*